United States Patent
Kim et al.

(10) Patent No.: US 12,237,715 B2
(45) Date of Patent: Feb. 25, 2025

(54) APPARATUS FOR SUPPLYING EMERGENCY POWER

(71) Applicant: LG ENERGY SOLUTION, LTD., Seoul (KR)

(72) Inventors: Ki-Deok Kim, Daejeon (KR); Jin-Hyun Lee, Daejeon (KR); Jo-Yeon Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/769,057

(22) PCT Filed: Feb. 8, 2021

(86) PCT No.: PCT/KR2021/001656
§ 371 (c)(1),
(2) Date: Apr. 14, 2022

(87) PCT Pub. No.: WO2021/162385
PCT Pub. Date: Aug. 19, 2021

(65) Prior Publication Data
US 2024/0106262 A1   Mar. 28, 2024

(30) Foreign Application Priority Data
Feb. 13, 2020   (KR) .................. 10-2020-0017877

(51) Int. Cl.
*H02J 9/06* (2006.01)
*H02J 7/00* (2006.01)

(52) U.S. Cl.
CPC .......... *H02J 9/061* (2013.01); *H02J 7/00308* (2020.01); *H02J 7/007182* (2020.01); *H02J 7/007188* (2020.01)

(58) Field of Classification Search
CPC .. H02J 9/061; H02J 7/007188; H02J 7/00308; H02J 7/007182
(Continued)

(56) References Cited

U.S. PATENT DOCUMENTS 5,963,019 A   10/1999   Cheon
5,969,529 A   10/1999   Eiraku et al.
(Continued)

FOREIGN PATENT DOCUMENTS

DE   10 2011 056270 A1   6/2012
EP      2 905 866 A1   8/2015
(Continued)

OTHER PUBLICATIONS

International Search Report (with partial English translation) issued in corresponding International Patent Application No. PCT/KR2021/001656 dated May 18, 2021.
(Continued)

*Primary Examiner* — Hal Kaplan
*Assistant Examiner* — Swarna N Chowdhuri
(74) *Attorney, Agent, or Firm* — Morgan, Lewis & Bockius LLP

(57) ABSTRACT

An apparatus for supplying emergency power according to an embodiment of the present disclosure includes: a protection circuit unit connected to a battery and configured to limit an available voltage range of the battery; a bypass unit connected in parallel to the protection circuit unit and configured to form a bypass path of a current output from the battery according to an operation state of a disposed switching element; and a control unit configured to electrically connect the bypass path formed by the bypass unit by controlling the operation state of the switching element to a turn-on state.

16 Claims, 7 Drawing Sheets

(58) Field of Classification Search
USPC .......................................................... 307/64
See application file for complete search history.

(56) References Cited

U.S. PATENT DOCUMENTS

| | | | |
|---|---|---|---|
| 2011/0260691 | A1 | 10/2011 | Ishibashi et al. |
| 2015/0200535 | A1 | 7/2015 | Uesugi et al. |
| 2018/0191179 | A1 | 7/2018 | Yi et al. |
| 2018/0233785 | A1* | 8/2018 | Na .................. H01M 10/425 |
| 2019/0074683 | A1 | 3/2019 | Uesugi et al. |
| 2020/0379050 | A1* | 12/2020 | Imanaka ............ H02J 7/0047 |

FOREIGN PATENT DOCUMENTS

| | | | |
|---|---|---|---|
| JP | H09-251063 | A | 9/1997 |
| JP | 2001-118607 | A | 4/2001 |
| JP | 2002-369397 | A | 12/2002 |
| JP | 2006-081238 | A | 3/2006 |
| JP | 5499872 | B2 | 5/2014 |
| JP | 2018-007388 | A | 1/2018 |
| JP | 2019-100878 | A | 6/2019 |
| KR | 10-1998-0021547 | A | 6/1998 |
| KR | 10-2015-0008227 | A | 1/2015 |
| KR | 10-1529550 | B1 | 6/2015 |
| KR | 10-1744374 | B1 | 6/2017 |
| KR | 10-1830281 | B1 | 2/2018 |
| KR | 10-2018-0058491 | A | 6/2018 |
| KR | 10-2018-0080938 | A | 7/2018 |

OTHER PUBLICATIONS

Office Action dated Feb. 27, 2023, issued in corresponding Japanese Patent Application No. 2022-506939.
Extended European Search Report issued in corresponding EP Patent Application No. 21 75 3235, dated Dec. 22, 2022.
Office Action dated Oct. 10, 2024 issued in corresponding Korean Patent Application No. 10-2020-0017877.

* cited by examiner

APPARATUS FOR SUPPLYING EMERGENCY POWER

TECHNICAL FIELD

The present application claims priority to Korean Patent Application No. 10-2020-0017877 filed on Feb. 13, 2020 in the Republic of Korea, the disclosures of which are incorporated herein by reference.

The present disclosure relates to an apparatus for supplying emergency power, and more particularly, to an apparatus for supplying emergency power capable of supplying an emergency power by expanding an available voltage range of a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In general, when a battery is overdischarged or overcharged, the battery may be damaged to accelerate degradation, and a swelling phenomenon in which the battery swells may occur. In addition, in severe cases, the battery may explode.

Conventionally, a protection circuit is connected to the battery to prevent overdischarge or overcharge of the battery (Patent Document 1). That is, Patent Document 1 discloses a configuration in which the voltage of a battery is maintained between an upper threshold voltage and a lower threshold voltage by using the protection circuit.

However, if the protection circuit operates even in a situation where an emergency situation occurs and thus additional power must be supplied from the battery, it is recognized as an overdischarge state so that the connection between the battery and a load is disconnected, even though an additional power can be sufficiently supplied from the battery. Therefore, it is necessary to develop a technology capable of supplying an emergency power when an emergency situation occurs by preventing the protection circuit from operating.

(Patent Document 1) KR 10-2003-0078289 A

DISCLOSURE

Technical Problem

The present disclosure is designed to solve the problems of the related art, and therefore the present disclosure is directed to providing an apparatus for supplying emergency power capable of supplying an emergency power when an emergency situation occurs by releasing an available voltage range of a battery limited by a protection circuit.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an apparatus for supplying emergency power, comprising: a protection circuit unit connected to a battery and configured to limit an available voltage range of the battery; a bypass unit connected in parallel to the protection circuit unit and configured to form a bypass path of a current output from the battery according to an operation state of a disposed switching element; and a control unit configured to electrically connect the bypass path formed by the bypass unit by controlling the operation state of the switching element to a turn-on state.

The bypass unit may be configured to form the bypass path, which allows the current of the battery to bypass the protection circuit unit, when the operation state of the switching element is controlled to a turn-on state.

The control unit may be configured to release the limit on the available voltage range by electrically connecting the bypass path.

The control unit may be configured to release the limit on a low-voltage range of the voltage range limited by the protection circuit unit, by electrically connecting the bypass path.

The control unit may be configured to control the operation state of the switching element to a turn-on state, when an emergency power supply request is input.

The control unit may be configured to control the operation state of the switching element to a turn-on state during a preset initial run time.

In another aspect, the apparatus for supplying emergency power may further comprise a measuring unit configured to measure a voltage of the battery.

The control unit may be configured to measure a discharge time during which the battery is continuously discharged and control the operation state of the switching element to a turn-on state when at least one of the measured discharge time and the measured voltage satisfies a predetermined condition.

The control unit may be configured to measure the discharge time while the measured voltage is being included in a preset low-voltage range and control the operation state of the switching element to a turn-on state when the measured discharge time is equal to or greater than a reference time.

After controlling the operation state of the switching element to a turn-on state, the control unit may be configured to control the operation state of the switching element according to a charge start voltage of the battery measured by the measuring unit when the battery starts being charged.

The control unit may be configured to control the operation state of the switching element to a turn-off state, when the charge start voltage is included in the preset low-voltage range.

The control unit may be configured to control the operation state of the switching element to a turn-on state, when the charge start voltage is lower than a lower limit of the preset low-voltage range.

The protection circuit unit may include a plurality of unit protection circuit units configured to limit the available voltage range of the battery by section.

The bypass unit may include a plurality of unit bypass units configured to be connected in parallel to at least one of the plurality of unit protection circuit units.

The control unit may be configured to select a unit protection circuit unit whose limited voltage section is closest to a present voltage of the battery among the plurality of unit protection circuit units and control an operation state of a switching element disposed in a unit bypass unit corresponding to the selected unit protection circuit unit to a turn-on state.

In another aspect of the present disclosure, there is also provided a battery management system (BMS), comprising the apparatus for supplying emergency power according to an aspect of the present disclosure.

In still another aspect of the present disclosure, there is also provided a battery pack, comprising the apparatus for supplying emergency power according to an aspect of the present disclosure.

Advantageous Effects

According to an aspect of the present disclosure, there is an advantage of supplying an emergency power by releasing the limit on the available voltage range of the battery under a predetermined condition.

In addition, according to an aspect of the present disclosure, since the apparatus for supplying emergency power autonomously determines whether an emergency situation occurs, an emergency power is supplied smoothly, thereby preventing the connection between the battery and the load from being unexpectedly released.

The effects of the present disclosure are not limited to the effects mentioned above, and other effects not mentioned will be clearly understood by those skilled in the art from the description of the claims.

DESCRIPTION OF DRAWINGS

The accompanying drawings illustrate embodiments of the present disclosure and, together with the foregoing disclosure, serve to provide further understanding of the technical features of the present disclosure, and thus, the present disclosure is not construed as being limited to the drawing.

EMBODIMENTS OF THE DISCLOSURE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
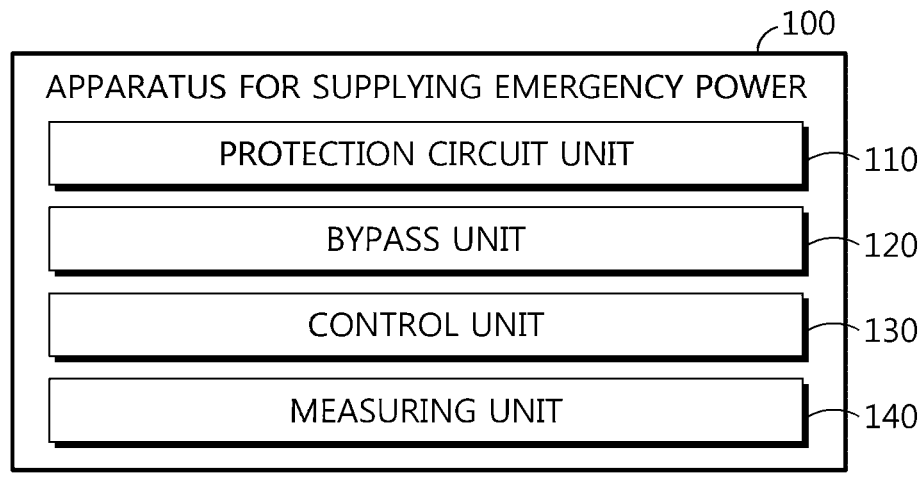
FIG. 1 is a diagram schematically showing an apparatus for supplying emergency power according to an embodiment of the present disclosure.

FIG. 1 is a diagram schematically showing an apparatus for supplying emergency power 100 according to an embodiment of the present disclosure.

Referring to FIG. 1, the apparatus for supplying emergency power 100 according to an embodiment of the present disclosure may include a protection circuit unit 110, a bypass unit 120, and a control unit 130.

First, the protection circuit unit 110 may be connected to a battery 10.

Here, the battery 10 includes a negative electrode terminal and a positive electrode terminal, and may refer to one independent cell that can be physically separated. For example, one pouch-type lithium polymer cell may be regarded as a battery cell. In addition, the battery 10 may refer to a battery module in which one or more battery cells are connected in series and/or in parallel. Hereinafter, for convenience of description, it will be described that the battery 10 refers to one independent battery cell.

The protection circuit unit 110 may be configured to limit an available voltage range of the battery 10.

That is, the protection circuit unit 110 may prevent the battery 10 from being overcharged or overdischarged by limiting the available voltage range of the battery 10.

For example, it is assumed that the protection circuit unit 110 is connected to a 4.5 [V] battery 10. The protection circuit unit 110 may be configured to limit the available voltage range to 2.7 [V] or more and 4 [V] or less in order to prevent the battery 10 from being overcharged or overdischarged.

The bypass unit 120 may be connected in parallel to the protection circuit unit 110.

Specifically, a connection relationship between the protection circuit unit 110 and the bypass unit 120 will be described with reference to FIG. 2.

Figure 2:
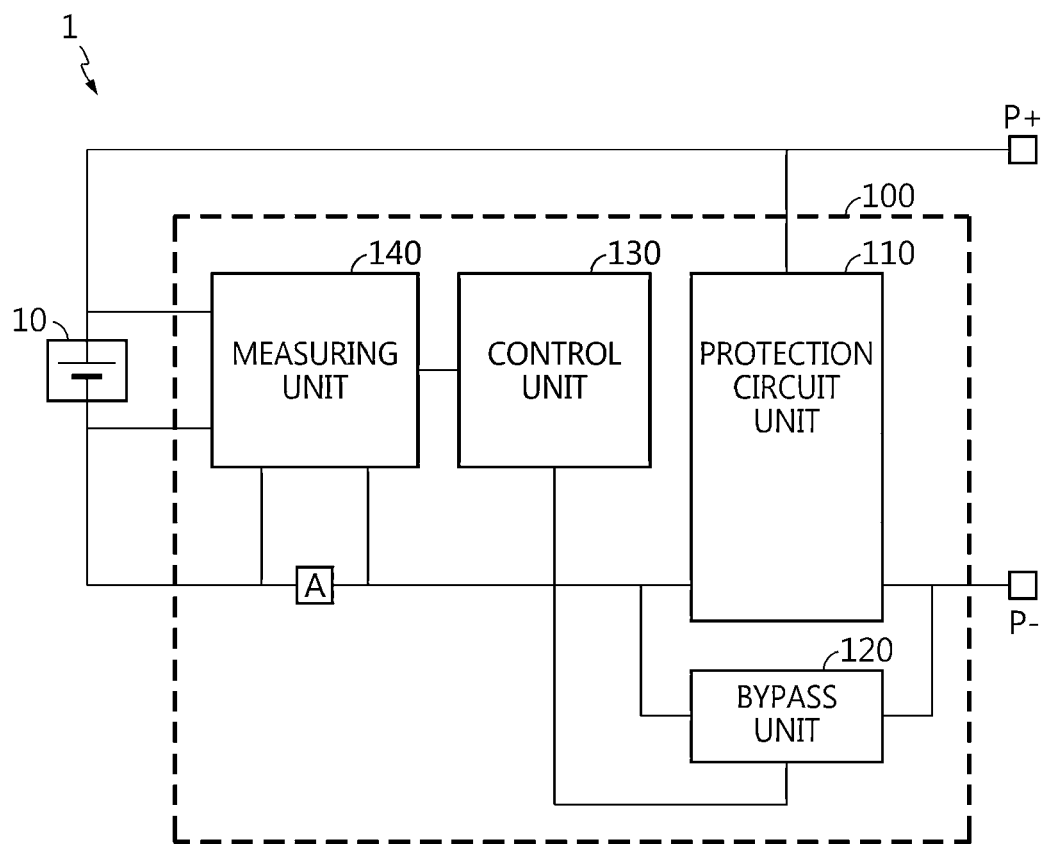
FIG. 2 is a diagram schematically showing a battery pack including the apparatus for supplying emergency power according to an embodiment of the present disclosure.

FIG. 2 is a diagram schematically showing a battery pack 1 including the apparatus for supplying emergency power 100 according to an embodiment of the present disclosure.

Referring to FIG. 2, the protection circuit unit 110 may be electrically connected to both ends of the battery 10. For example, one end of the protection circuit unit 110 may be connected to the positive electrode terminal of the battery 10, and the other end of the protection circuit unit 110 may be connected to the negative electrode terminal of the battery 10. That is, one end of the protection circuit unit 110 may be connected between the positive electrode terminal of the battery 10 and a positive electrode terminal P+ of the battery pack 1, and the other end of the protection circuit unit 110 may be connected between the negative electrode terminal of the battery 10 and a negative electrode terminal P− of the battery pack 1. In addition, one end of the bypass unit 120 may be connected to the negative electrode terminal of the battery 10, and the other end of the bypass unit 120 may be connected to the negative electrode terminal P− of the battery pack 1.

Here, a load may be connected to the positive electrode terminal P+ and the negative electrode terminal P− of the battery pack 1. For example, the load may be a charging terminal capable of charging the battery 10 or a terminal for receiving power from the battery 10.

In addition, the bypass unit 120 may be configured to form a bypass path of a current output from the battery 10 according to an operation state of a disposed switching element 121.

Specifically, the bypass unit 120 may be configured to form the bypass path configured such that the current of the battery 10 bypasses the protection circuit unit 110 when the operation state of the switching element 121 is controlled to a turn-on state.

An exemplary configuration of the protection circuit unit 110 and the bypass unit 120 will be described with reference to FIG. 3.

Figure 3:
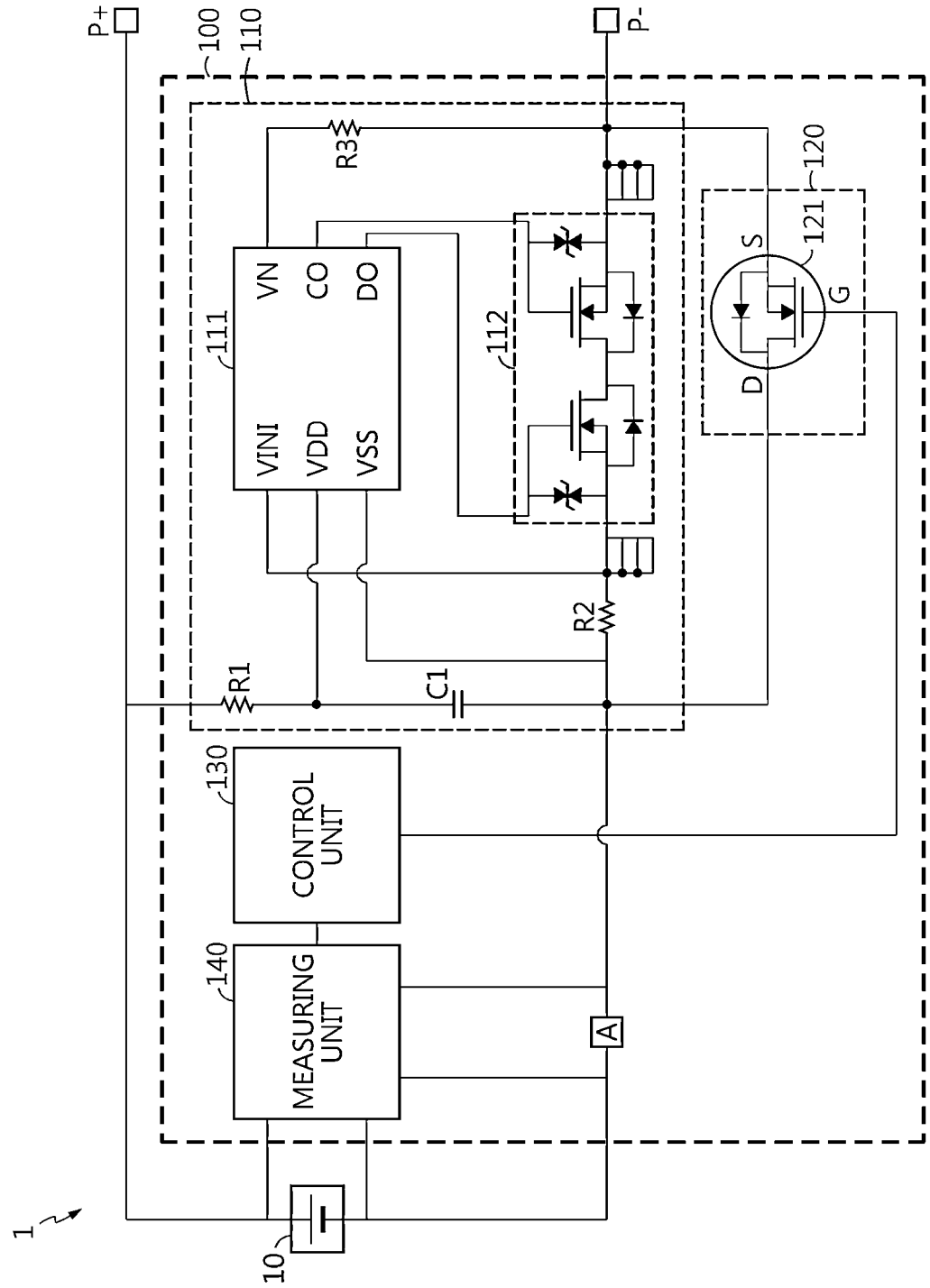
FIG. 3 is a diagram showing an exemplary configuration of the battery pack including the apparatus for supplying emergency power according to an embodiment of the present disclosure.

FIG. 3 is a diagram showing an exemplary configuration of the battery pack 1 including the apparatus for supplying emergency power 100 according to an embodiment of the present disclosure.

Referring to FIG. 3, the bypass unit 120 may include a switching element 121. One end of the switching element 121 may be connected to the negative electrode terminal of the battery 10, and the other end may be configured to be connected to the negative electrode terminal P− of the battery pack 1.

For example, in the embodiment of FIG. 3, if the bypass unit 120 is electrically connected, a bypass path for connecting the negative electrode terminal of the battery 10 and the negative electrode terminal P− of the battery pack 1 may be formed.

In addition, referring to FIG. 3, the protection circuit unit 110 may include a plurality of resistors R1, R2, R3, a capacitor C, an ICT 111, and a switching unit 112. By the configuration of the protection circuit unit 110, the available voltage range of the battery 10 may be limited. The control unit 130 may be configured to electrically connect the bypass path formed by the bypass unit 120 by controlling the operation state of the switching element 121 to a turn-on state.

Specifically, the control unit 130 may be configured to control the operation state of the switching element 121 to a turn-on state or a turn-off state. If the control unit 130 controls the operation state of the switching element 121 to a turn-on state, the bypass path formed by the bypass unit 120 may be electrically connected. In this case, the current output from the battery 10 may flow through the bypass path without passing through the protection circuit unit 110.

For example, in the embodiment of FIG. 3, the switching element 121 may employ a metal-oxide semiconductor field effect transistor (MOSFET). The switching element 121 may include a drain terminal D, a source terminal S, and a gate terminal G. The control unit 130 may be electrically connected to the gate terminal G of the switching element 121 and output a control signal to the gate terminal G. According to the control signal output by the control unit 130, the operation state of the switching element 121 may be controlled to a turn-on state or a turn-off state.

The apparatus for supplying emergency power 100 according to an embodiment of the present disclosure has an advantage of controlling the current output from the battery 10 to flow through the bypass unit 120 or the protection circuit unit 110 by controlling the operation state of the switching element 121 provided in the bypass unit 120.

Meanwhile, the control unit 130 provided to the apparatus for supplying emergency power 100 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 130 may be implemented as a set of program modules. At this time, the program module may be stored in a memory and executed by the control unit 130. The memory may be located inside or out of the control unit 130 and may be connected to the control unit 130 by various well-known means.

In addition, the apparatus for supplying emergency power 100 according to an embodiment of the present disclosure may further include a storage unit (not shown). The storage unit may store programs, data and the like required for the control unit 130 to manage the switching element 121. That is, the storage unit may store data necessary for operation and function of each component of the apparatus for supplying emergency power 100, data generated in the process of performing the operation or function, or the like. The storage unit is not particularly limited in its kind as long as it is a known information storage means that can record, erase, update and read data. As an example, the information storage means may include RAM, flash memory, ROM, EEPROM, registers, and the like. In addition, the storage unit may store program codes in which processes executable by the control unit 130 are defined.

Preferably, the control unit 130 may be configured to release the limit on the available voltage range by electrically connecting the bypass path.

Figure 4:
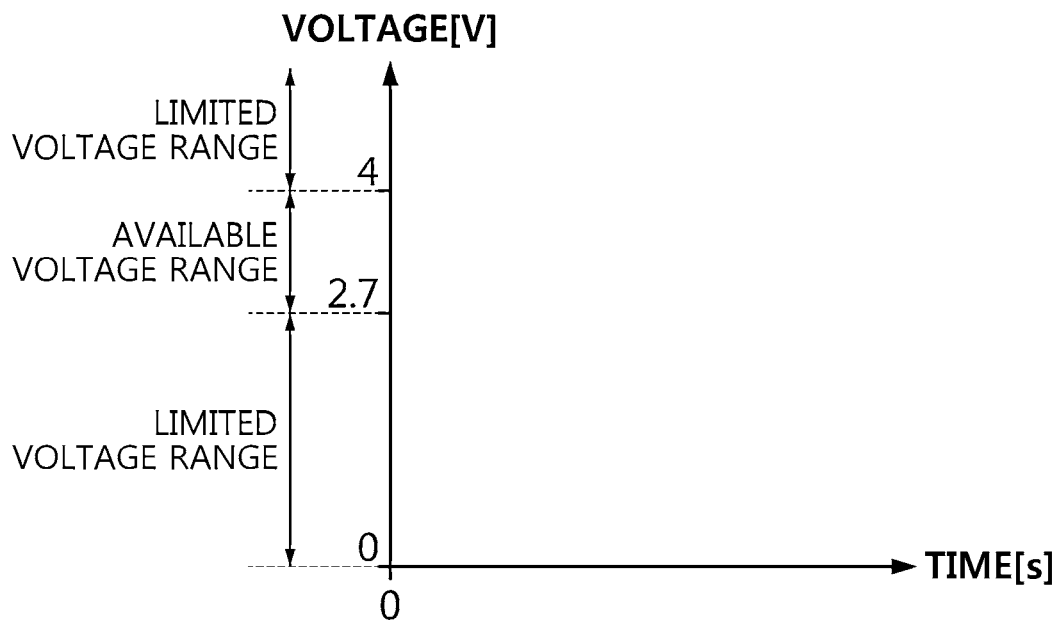
FIG. 4 is a diagram schematically showing a voltage range of a battery connected to the apparatus for supplying emergency power according to an embodiment of the present disclosure.

FIG. 4 is a diagram schematically showing a voltage range of a battery 10 connected to the apparatus for supplying emergency power 100 according to an embodiment of the present disclosure.

For example, the battery 10 of the embodiment of FIG. 4 is an example to which a 4.5 [V] pouch-type battery cell is applied.

In the embodiment of FIG. 4, the available voltage range of the battery 10 may be limited to 2.7 [V] or more and 4 [V] or less. Since the degradation rate of the battery 10 may be generally increased if the voltage of the battery 10 is less than 2.7 [V] or more than 4 [V], the limited available voltage range may be a voltage range arbitrarily set to prevent degradation of the battery 10. However, it should be noted that the available voltage range of the battery 10 may be set differently from the range shown in FIG. 4 and the available voltage range may not be limitedly interpreted by the numerical values shown in the drawings and the embodiments of the present disclosure.

If the control unit 130 controls the operation state of the switching element 121 provided in the bypass unit 120 to a turn-on state, the bypass path formed by the bypass unit 120 may be electrically connected. In this case, since the current output from the battery 10 does not pass through the protection circuit unit 110, the voltage range limited by the protection circuit unit 110 may be released.

For example, in the embodiment of FIG. 4, if the control unit 130 electrically connects the bypass path, the limit on the voltage range of 0 [V] or more and 2.7 [V] or less and the voltage range of more than 4 [V] may be released.

Since the available voltage range of the battery 10 is extended in this way, the battery 10 may be used for a long time.

Preferably, the control unit 130 may be configured to release the limit on a low-voltage range of the voltage range limited by the protection circuit unit 110 by electrically connecting the bypass path.

A case where the battery 10 is provided in a portable terminal will be described as an example. In a situation where the voltage of the battery 10 is close to a lower limit of the available voltage range so that the remaining amount of the battery 10 is short and the battery 10 is not being charged, there may occur a case in which the portable terminal needs to be used urgently. For example, this may be a case where it is necessary to turn on the flash of the portable terminal in a dark space or a case where an emergency call is in progress.

As another example, a case where the battery 10 is provided in a vehicle will be described as an example. When a vehicle is running, even if the voltage of the battery 10 reaches the lower limit of the available voltage range, there may be a case where the battery 10 must be continuously operated to supply an emergency power for the safety of a driver.

In the case where the battery 10 should be urgently used even if the battery 10 is degraded rapidly as in the above exemplary examples, the control unit 130 may electrically connect the bypass path in order to release the limit on the available voltage range of the battery 10. In addition, since the available voltage range of the battery 10 is extended, the battery 10 may be operated longer.

Accordingly, when an emergency situation occurs, the apparatus for supplying emergency power 100 according to an embodiment of the present disclosure may release the limit on the available voltage range of the battery 10 by electrically connecting the bypass path by the bypass unit 120. Therefore, in an emergency situation, the operating time of the battery 10 may be increased, so the user has an advantage of taking appropriate measures for the emergency situation by using the emergency power supplied by the battery 10.

Hereinafter, each embodiment in which the control unit 130 controls the operation state of the switching element 121 provided in the bypass unit 120 to a turn-on state will be described.

First, the control unit 130 may be configured to control the operation state of the switching element 121 to a turn-on state if an emergency power supply request is input.

For example, the control unit 130 may be configured to communicate with the outside. If the control unit 130 receives an emergency power supply request from the outside, the control unit 130 may control the operation state of the switching element 121 to a turn-on state. In this case, the available voltage range of the battery 10 is extended so that the battery 10 may be continuously discharged. Therefore, the emergency power may be supplied to the load.

In another embodiment, the control unit 130 may be configured to control the operation state of the switching element 121 to a turn-on state during a preset initial run time.

Specifically, the control unit 130 may count the preset initial run time from a time point when the battery 10 starts operating. That is, when the battery 10 starts operating, the control unit 130 may control the operation state of the switching element 121 to a turn-on state during the preset initial run time, thereby releasing the voltage range limited by the protection circuit unit 110.

Here, the preset initial run time may be stored in advance in the control unit 130 or the storage unit.

Figure 5:
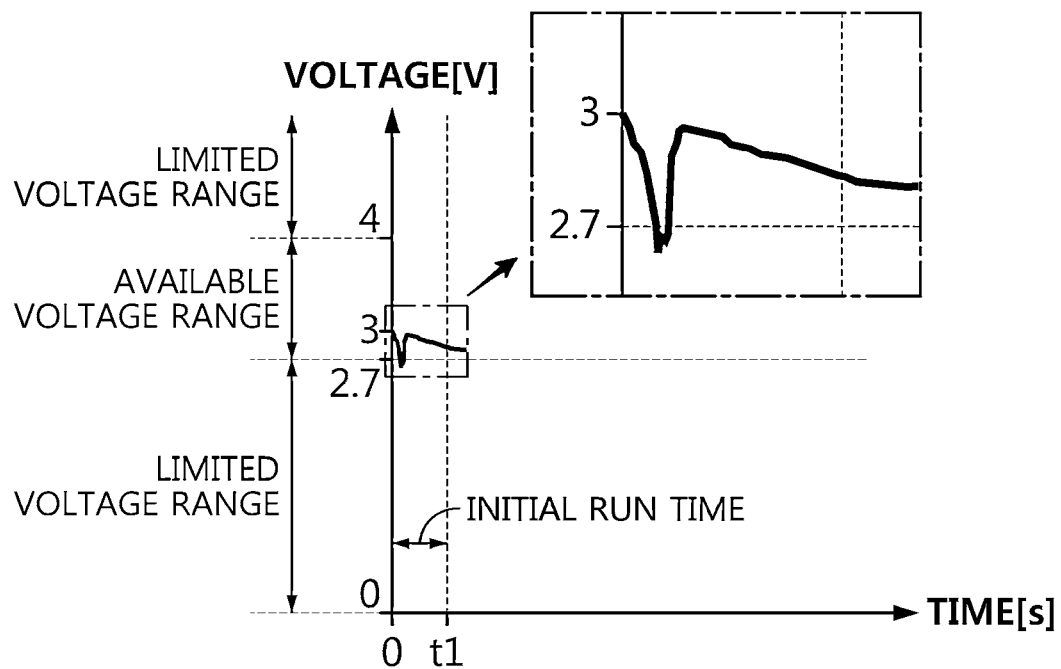
FIG. 5 is a diagram schematically showing an example of an abnormal behavior of the battery.

FIG. 5 is a diagram schematically showing an example of an abnormal behavior of the battery 10.

For example, in the embodiment of FIG. 5, during the initial run time of the battery 10, the voltage of the battery 10 may be abnormally and temporarily decreased.

Here, the initial run time may be set to correspond to a maximum capacity of the battery 10. That is, as the maximum capacity [mAh] of the battery 10 is greater, the initial run time may be set longer. For example, in the embodiment of FIG. 5, the initial run time may be set to 10 seconds.

Since the battery 10 has both physical and chemical characteristics, there may be a case where the voltage of the battery 10 is abnormally decreased due to external factors when the battery 10 starts operating. For example, when the battery 10 starts operating, if the temperature of the battery 10 is very low or very high to be out of a reference temperature range, the voltage of the battery 10 may temporarily decrease. As another example, when the battery 10 starts operating, a case where the voltage of the battery 10 temporarily decreases due to degradation of the battery 10 may occur.

As in the embodiment of FIG. 5, when the voltage of the battery 10 is abnormally decreased below the available voltage range, if the protection circuit unit 110 is operated, the connection between the battery 10 and the load may be immediately cut off. That is, there may be a case where the connection between the battery 10 and the load is unexpectedly cut off due to an abnormal behavior of the battery 10.

The control unit 130 may control the operation state of the switching element 121 of the bypass unit 120 to a turn-on state during the initial run time in order to cope with an abnormal behavior of the battery 10. Accordingly, in the embodiment of FIG. 5, even if the voltage of the battery 10 reaches 2.7 [V] within the initial run time, the connection between the battery 10 and the load may not be cut off. In addition, after the preset initial run time, the control unit 130 may control the operation state of the switching element 121 of the bypass unit 120 to a turn-off state so that the protection circuit unit 110 operates.

Since the apparatus for supplying emergency power 100 according to an embodiment of the present disclosure prevents the protection circuit unit 110 from operating during the preset initial run time, there is an advantage of preventing the connection between the battery 10 and the load from being unexpectedly released due to an abnormal behavior of the battery 10 when the battery 10 starts operating.

Hereinafter, still another embodiment in which the control unit 130 controls the operation state of the switching element 121 will be described.

First, referring to FIG. 1, the apparatus for supplying emergency power 100 according to an embodiment of the present disclosure may further include a measuring unit 140 configured to measure a voltage of the battery 10.

For example, in the embodiment of FIG. 2, the measuring unit 140 may be electrically connected directly to both ends of the battery 10. The measuring unit 140 may measure the voltage of the battery 10 by measuring a positive electrode voltage and a negative electrode voltage of the battery 10 and calculating a difference between the measured positive and negative electrode voltages.

In addition, the measuring unit 140 may transmit the measured voltage of the battery 10 to the control unit 130.

The control unit 130 may be configured to measure a discharge time during which the battery 10 is continuously discharged.

For example, if charging and discharging of the battery 10 are alternately performed, the control unit 130 may measure a discharge time during which the battery 10 is continuously discharged. That is, the control unit 130 may be configured to measure a discharge time during which the battery 10 is continuously discharged without measuring the total time that the battery 10 is discharged.

The control unit 130 may be configured to control the operation state of the switching element 121 to a turn-on state if at least one of the measured discharge time and the measured voltage satisfies a predetermined condition.

That is, based on at least one of the measured discharge time and the voltage measured by the measuring unit 140, the control unit 130 may determine whether there occurs an emergency situation in which an emergency power must be supplied. In addition, if it is determined that an emergency situation occurs, the control unit 130 may supply an emergency power to the load by controlling the operation state of the switching element 121 provided in the bypass unit 120 to a turn-on state.

Therefore, the apparatus for supplying emergency power 100 according to an embodiment of the present disclosure may determine whether an emergency situation occurs based on at least one of the voltage and the discharge time of the battery 10, even if an emergency power supply request is not input from the outside. In addition, if it is determined that an emergency situation occurs, the apparatus for supplying emergency power 100 may electrically connect the bypass path to supply an emergency power to the load. Therefore, even when the user cannot request emergency power supply or the emergency power supply request is not normally transmitted to the control unit 130, the apparatus for supplying emergency power 100 has an advantage of determining whether an emergency situation occurs and supplying an emergency power.

Preferably, the control unit 130 may be configured to measure the discharge time while the measured voltage is included in a preset low-voltage range.

Specifically, the control unit 130 may measure the discharge time only when the voltage of the battery 10 received from the measuring unit 140 is included in the preset low-voltage range.

Here, the preset low-voltage range may be stored in advance in the control unit 130 or the storage unit.

Figure 6:
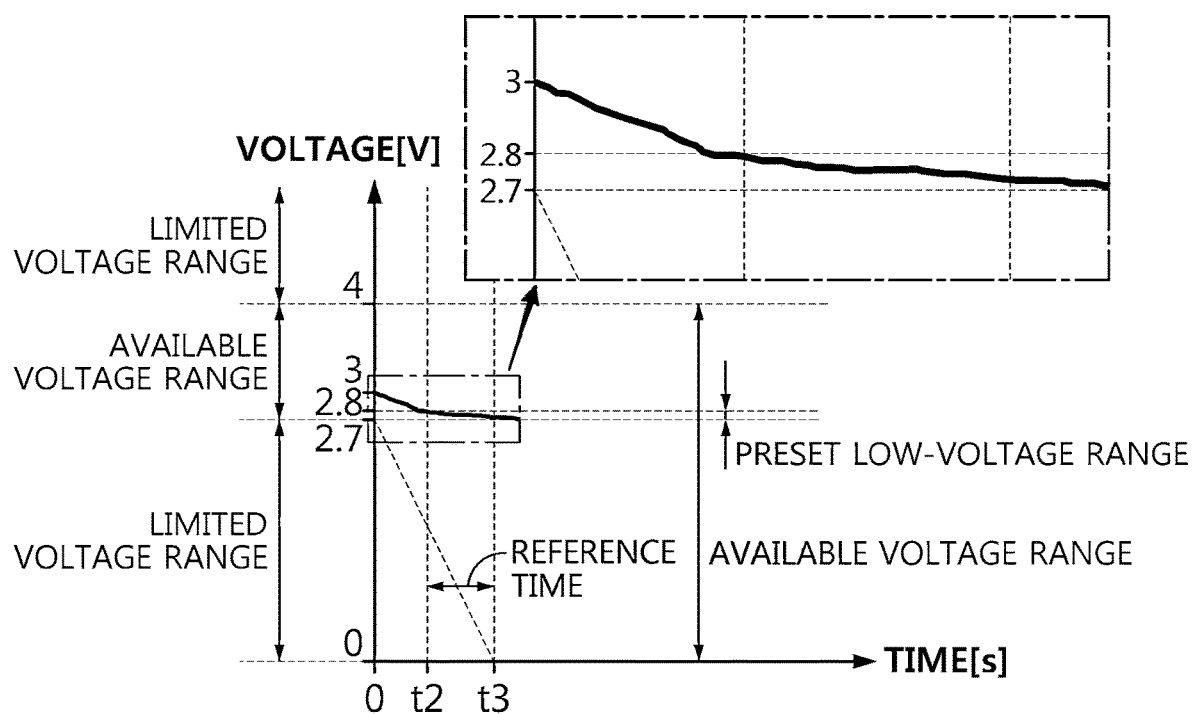
FIG. 6 is a diagram showing an example in which the apparatus for supplying emergency power according to an embodiment of the present disclosure releases the limit on the available voltage range of the battery.

FIG. 6 is a diagram showing an example in which the apparatus for supplying emergency power 100 according to an embodiment of the present disclosure releases the limit on the available voltage range of the battery 10.

For example, in the embodiment of FIG. 6, it is assumed that the battery 10 is continuously discharged from 0 second. In addition, it is assumed that the preset low-voltage range is 2.7 [V] or more and 2.8 [V] or less. The control unit 130 may measure the discharge time of the battery 10 from a time point t2 when the voltage of the battery 10 received from the measuring unit 140 is included in the preset low-voltage range.

In addition, the control unit 130 may be configured to control the operation state of the switching element 121 to a turn-on state if the measured discharge time is equal to or greater than a reference time.

For example, in the embodiment of FIG. 6, if the discharge time of the battery 10 measured from the time point t2 increases over the reference time, the control unit 130 may control the operation state of the switching element 121 to a turn-on state. That is, the control unit 130 may extend the available voltage range (2.7 [V] or more and 4 [V] or less) to 0 [V] or more and 4 [V] or less by controlling the operation state of the switching element 121 to a turn-on state at a time point t3.

Specifically, while the battery 10 is being continuously discharged, the control unit 130 may determine that an emergency situation occurs, if the time during which the voltage of the battery 10 belongs to the preset low-voltage range is greater than or equal to the reference time. For example, in a situation where the remaining amount of the battery 10 is low and the battery 10 cannot be charged, if the battery 10 must be continuously used, this situation may correspond to above case.

Therefore, the apparatus for supplying emergency power 100 according to an embodiment of the present disclosure has an advantage of reducing the hassle of requiring a user to directly request the supply of an emergency power by autonomously determining whether an emergency situation occurs. In addition, since an emergency power is supplied by the determination of the control unit 130, there is an advantage in that an accident that may occur due to unexpected disconnection between the battery 10 and the load may be prevented in advance.

The control unit 130 may be configured to control the operation state of the switching element 121 to a turn-on state and then control the operation state of the switching element 121 according to the charge start voltage of the battery 10 measured by the measuring unit 140 when the battery 10 starts being charged.

Specifically, the measuring unit 140 may measure the charge start voltage of the battery 10 when the battery 10 starts being charged, after the operation state of the switching element 121 is controlled to a turn-on state.

In addition, the control unit 130 may control the operation state of the switching element 121 according to whether the charge start voltage of the battery 10 is included in the preset low-voltage range.

For example, the control unit 130 may be configured to control the operation state of the switching element 121 to a turn-off state if the charge start voltage is included in the preset low-voltage range. Conversely, the control unit 130 may be configured to control the operation state of the switching element 121 to a turn-on state if the charge start voltage is lower than the lower limit of the preset low-voltage range.

That is, the control unit 130 may release or block the bypass path formed by the bypass unit 120 according to the charge start voltage of the battery 10.

For example, if the operation state of the switching element 121 is controlled to a turn-on state to form a bypass path by the bypass unit 120, the battery 10 may supply an emergency power. In this process, if the voltage of the battery 10 is lowered to less than the preset low-voltage range, the voltage of the battery 10 may be less than the preset low-voltage range even when the battery 10 starts being charged. In this case, if the control unit 130 switches the operation state of the switching element 121 to a turn-off state, the protection circuit unit 110 may be operated to release the connection between the battery 10 and the load. That is, although the battery 10 starts being charged, the voltage of the battery 10 that has already supplied an emergency power may not be included in the available voltage range. Therefore, the control unit 130 does not control the operation state of the switching element 121 to a turn-off state only due to the fact that the battery 10 starts being charged, but may control the operation state of the switching element 121 in consideration of the charge start voltage of the battery 10.

Preferably, after the battery 10 starts being charged, if the voltage of the battery 10 is included in the preset low-voltage range, the control unit 130 may control the operation state of the switching element 121 to a turn-off state so that the protection circuit unit 110 operates.

For example, in the embodiment of FIG. 6, it is assumed that the operation state of the switching element 121 is controlled to a turn-on state at the time point t3 so that the available voltage range is extended to 0 [V] or less and 4 [V] or more. In addition, it is assumed that the voltage of the battery 10 is decreased below the lower limit (2.7 [V]) of the preset low-voltage range after the time point t3. After that, even if the battery 10 is charged, the voltage of the battery 10 may be less than 2.7 [V]. Therefore, if the voltage of the battery 10 is included in the preset low-voltage range (2.7 [V] or more and 2.8 [V] or less), the control unit 130 may control the operation state of the switching element 121 to a turn-off state to block the bypass path formed by the bypass unit 120 and to operate the protection circuit unit 110.

More preferably, the control unit 130 may be configured to control the operation state of the switching element 121 to a turn-on state in consideration of not only the voltage and the discharge time of the battery 10 but also a current of the battery 10.

First, the measuring unit 140 may be configured to further measure the current of the battery 10.

For example, in the embodiment of FIG. 2, the measuring unit 140 may be connected to a current measuring element A for measuring the current of the battery 10. Here, the current measuring element A may be an ampere meter and/or a sense resistor.

The measuring unit 140 may transmit the measured current of the battery 10 to the control unit 130, and the control unit 130 may receive the current of the battery 10 from the measuring unit 140 together with the voltage of the battery 10.

In addition, the control unit 130 may be configured to measure the discharge time while the measured current is being included in a preset low-current range and the measured voltage is being included in the preset low-voltage range.

Here, the preset low-current range may be stored in advance in the control unit 130 or the storage unit.

Specifically, the control unit 130 may measure the discharge time during which the battery 10 is continuously discharged, only when the voltage of the battery 10 is included in the preset low-voltage range and the current of the battery 10 is included in the preset low-current range. That is, the control unit 130 may measure the discharge time while the battery 10 is being operated in a low power mode.

The control unit 130 may be configured to control the operation state of the switching element 121 to a turn-on state if the measured discharge time is greater than or equal to the reference time.

For example, if the battery 10 is not charged and is used over the reference time in a low power mode, the control unit 130 may determine that it is an emergency situation requiring urgent use of the battery 10. In this case, the control unit 130 may be configured to supply an emergency power to the load by controlling the operation state of the switching element 121 to a turn-on state.

Figure 7:
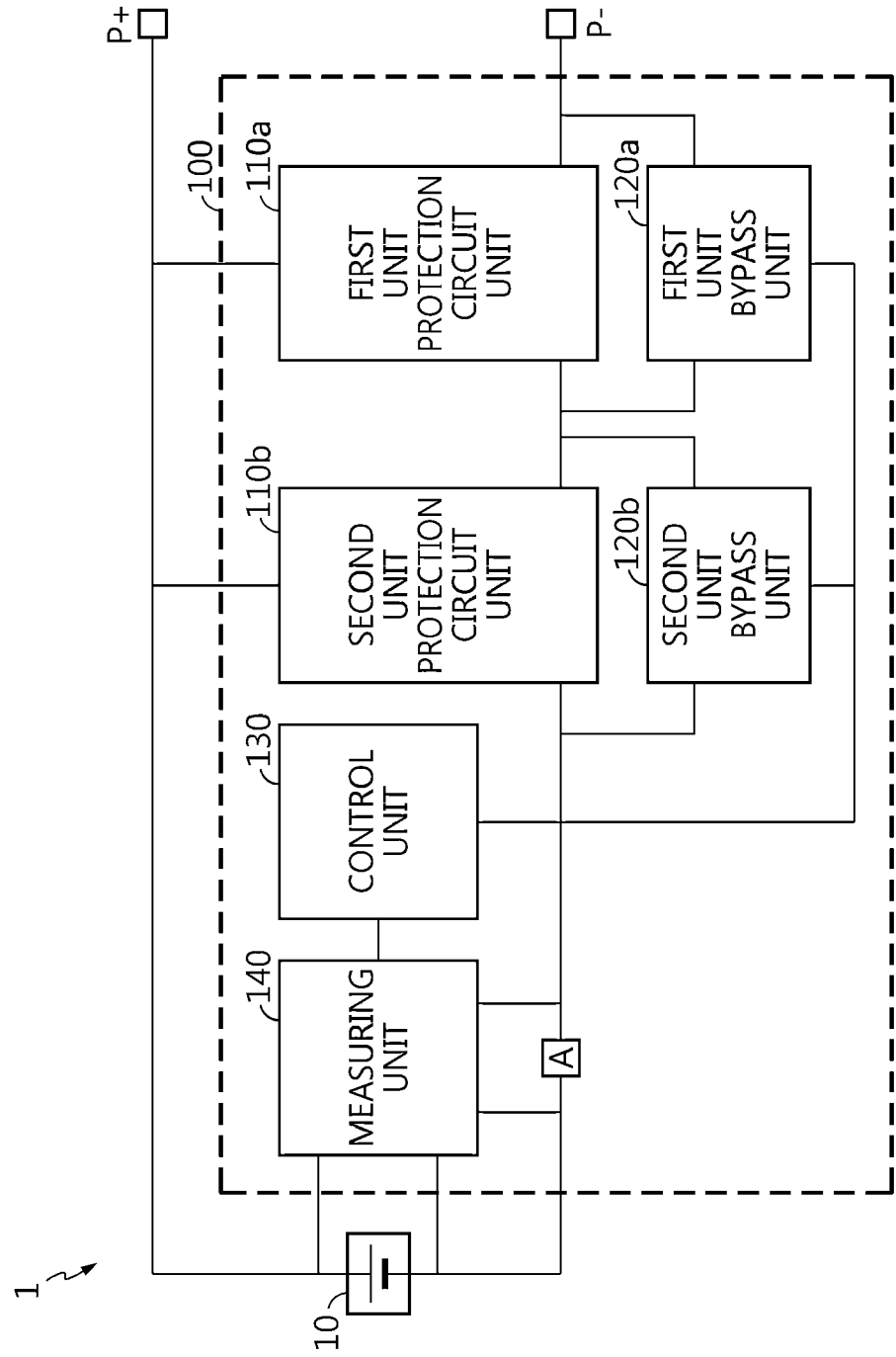
FIG. 7 is a diagram showing an exemplary configuration of a battery pack including an apparatus for supplying emergency power according to another embodiment of the present disclosure.
Figure 8:
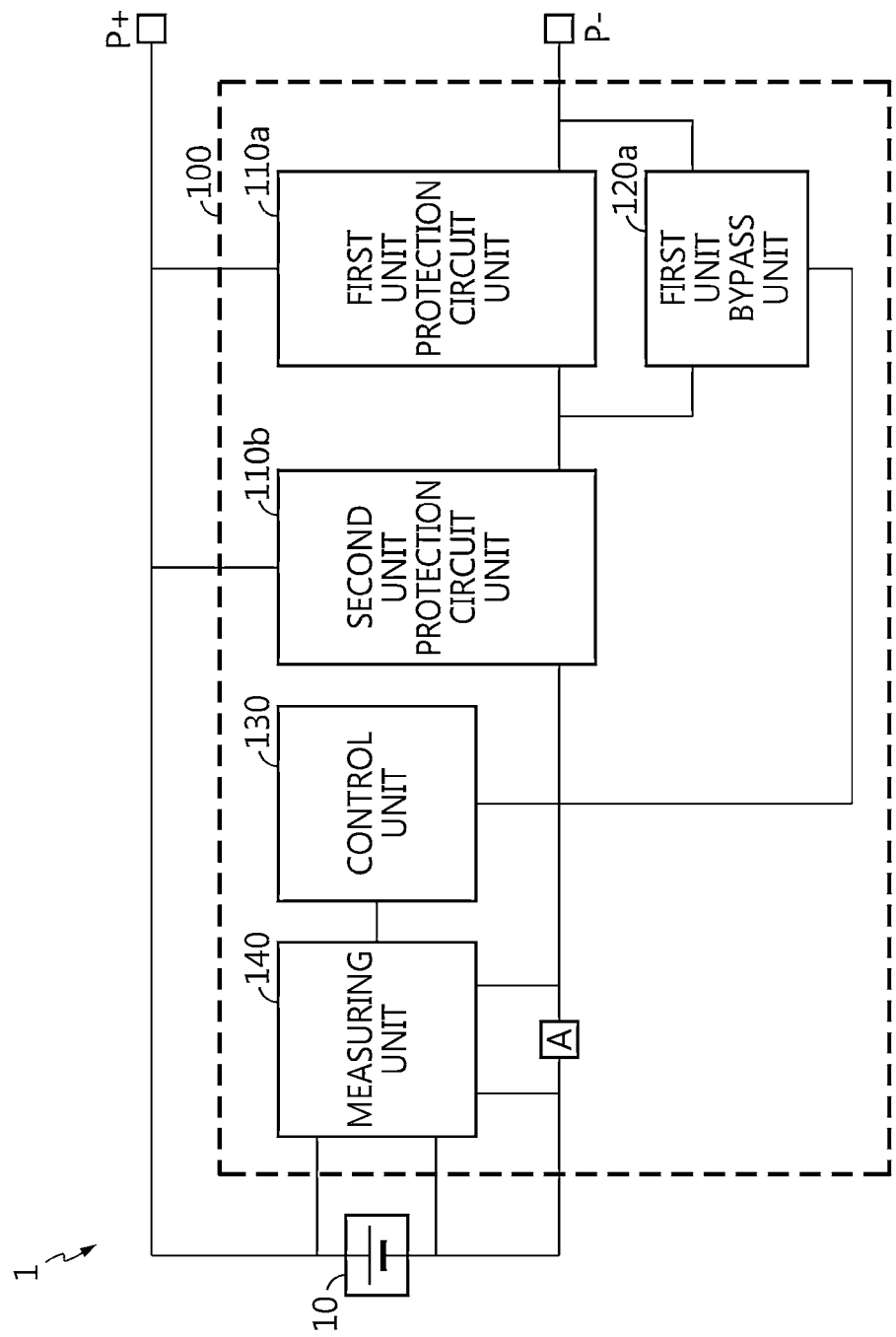
FIG. 8 is a diagram showing an exemplary configuration of a battery pack including an apparatus for supplying emergency power according to still another embodiment of the present disclosure.

FIG. 7 is a diagram showing an exemplary configuration of a battery pack 1 including an apparatus for supplying emergency power 100 according to another embodiment of the present disclosure. FIG. 8 is a diagram showing an exemplary configuration of a battery pack 1 including an apparatus for supplying emergency power 100 according to still another embodiment of the present disclosure.

The protection circuit unit 110 may include a plurality of unit protection circuit units 110 configured to limit the available voltage range of the battery 10 by section.

For example, referring to FIGS. 7 and 8, the apparatus for supplying emergency power 100 may include a first unit protection circuit unit 110a and a second unit protection circuit unit 110b. However, it should be noted that the number of the plurality of unit protection circuit units 110 is not limited to the embodiment illustrated in FIGS. 7 and 8.

In addition, the bypass unit 120 may include a plurality of unit bypass units 120 configured to be connected in parallel to at least one of the plurality of unit protection circuit units 110.

For example, FIG. 7 is an embodiment in which a first unit bypass unit 120a and a second unit bypass unit 120b are included in the apparatus for supplying emergency power 100. Specifically, the first unit bypass unit 120a may be connected in parallel to the first unit protection circuit unit 110a, and the second unit bypass unit 120b may be connected in parallel to the second unit protection circuit unit 110b.

As another example, FIG. 8 is an embodiment in which only the first unit bypass unit 120a is included in the apparatus for supplying emergency power 100. The first unit bypass unit 120a may be connected in parallel to the first unit protection circuit unit 110a. In this case, since the second unit bypass unit 120b is not included, the current output from the battery 10 cannot bypass the second unit protection circuit unit 110b. Therefore, the control unit 130 cannot release the limit on the voltage range according to the second unit protection circuit unit 110b.

That is, the apparatus for supplying emergency power 100 shown in FIG. 8 includes only the first unit bypass unit 120*a*. The apparatus for supplying emergency power 100 may extend the available voltage range to a first voltage range limited by the first unit protection circuit unit 110*a* in certain cases, but may be configured to always operate the second unit protection circuit unit 110*b* in order to prevent serious degradation of the battery 10.

Preferably, voltage ranges of the battery 10 limited by the plurality of unit protection circuit units 110 may be different from each other. More preferably, the plurality of unit protection circuit units 110 may be configured to limit a voltage range closer to the available voltage range of the battery 10 as being provided closer to the electrode terminal of the battery pack 1.

Figure 9:
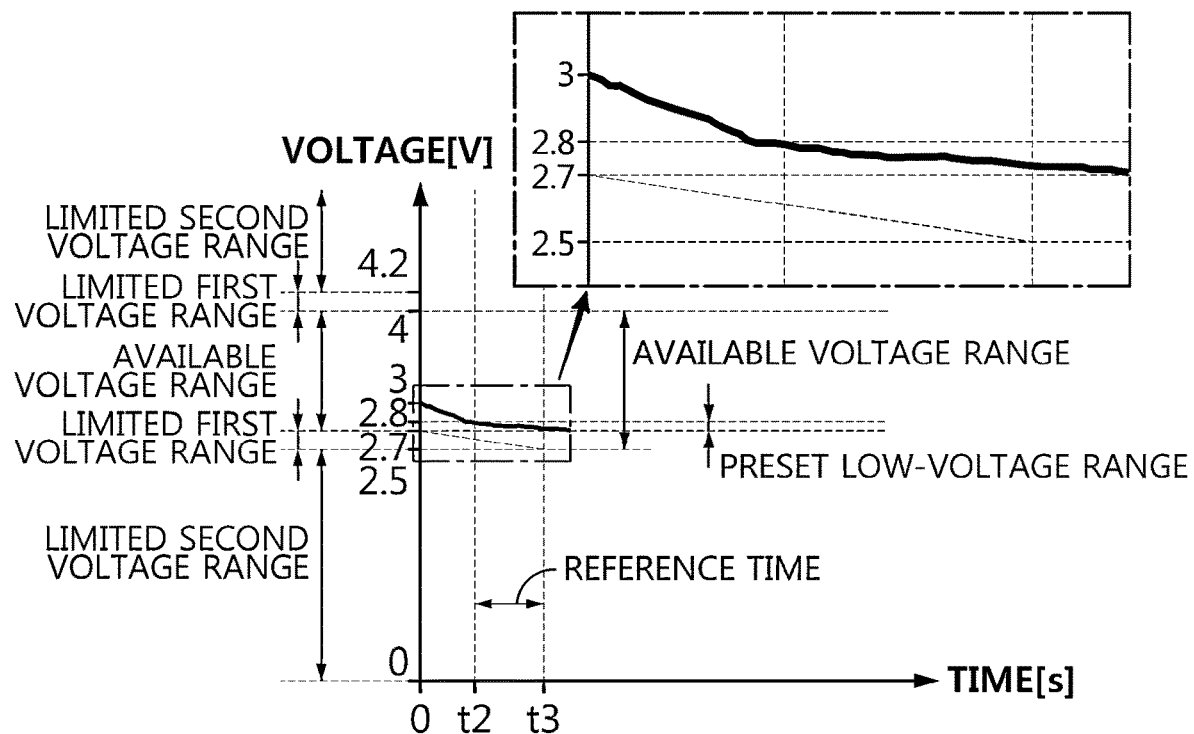
FIG. 9 is a diagram showing another example in which the apparatus for supplying emergency power according to an embodiment of the present disclosure releases the limit on the available voltage range of the battery.

FIG. 9 is a diagram showing another example in which the apparatus for supplying emergency power 100 according to an embodiment of the present disclosure releases the limit on the available voltage range of the battery 10.

For example, in the embodiment of FIG. 9, the limited first voltage range is a range of 2.5 [V] or more and less than 2.7 [V], and more than 4 [V] and 4.2 [V] or less, which is the voltage range limited by the first unit protection circuit unit 110*a*. The limited second voltage range is a range of less than 2.5 [V] and more than 4.2 [V], which is the voltage range limited by the second unit protection circuit unit 110*b*.

Therefore, by including the plurality of unit protection circuit units 110, the apparatus for supplying emergency power 100 according to another embodiment of the present disclosure has an advantage of limiting the voltage range of the battery 10 in more detail.

Preferably, the control unit 130 may be configured to select a unit protection circuit unit 110 whose limited voltage section is closest to a present voltage of the battery 10 among the plurality of unit protection circuit units 110.

In addition, the control unit 130 may be configured to control the operation state of the switching element 121 disposed in the unit bypass unit 120 corresponding to the selected unit protection circuit unit 110 to a turn-on state.

For example, in the embodiment of FIG. 9, the control unit 130 may select the first unit protection circuit unit 110*a* that limits the first voltage range.

It is assumed that the voltage of the battery 10 belongs to the preset low-voltage range but the control unit 130 controls the operation state of the switching element 121 disposed in the second unit bypass unit 120*b* to a turn-on state. In this case, since the first voltage range is still limited, there may be a problem in that an emergency power is not supplied to the load regardless that the limit of the second voltage range is released.

Therefore, the control unit 130 may release the limit on the voltage range closest to the present voltage of the battery 10, so that an emergency power may be smoothly supplied.

The apparatus for supplying emergency power 100 according to the present disclosure may be applied to a BMS (Battery Management System). That is, the BMS according to the present disclosure may include the apparatus for supplying emergency power 100 described above. In this configuration, at least some of components of the apparatus for supplying emergency power 100 may be implemented by supplementing or adding functions of components included in a conventional BMS. For example, the protection circuit unit 110, the bypass unit 120, the measuring unit 140 and the control unit 130 of the apparatus for supplying emergency power 100 may be implemented as components of the BMS.

In addition, the apparatus for supplying emergency power 100 according to the present disclosure may be provided to a battery pack 1. That is, the battery pack 1 according to the present disclosure may include the apparatus for supplying emergency power 100 and at least one battery cell. In addition, the battery pack 1 may further include electrical equipment (a relay, a fuse, etc.), and a case.

The embodiments of the present disclosure described above may not be implemented only through an apparatus and method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

DESCRIPTION OF REFERENCES

1: battery pack
10: battery
100: apparatus for supplying emergency power
110: protection circuit unit
120: bypass unit
121: switching element
130: control unit
140: measuring unit

What is claimed is:

1. An apparatus for supplying emergency power, comprising:
   a protection circuit connected to a battery and configured to limit an available voltage range of the battery to a limited available voltage range from a lower limit greater than 0 to an upper limit less than a maximum voltage of the battery;
   a bypass circuit including a switching element connected in parallel to the protection circuit and configured to form a bypass path of a current output from the battery according to an operation state of the switching element;
   a measuring circuit configured to measure a voltage of the battery; and
   a control circuit configured to control the operation state of the switching element to a turn-on state to electrically connect the bypass path of the current output from the battery to bypass the protection circuit and to release at least one of the lower limit and the upper limit on the available voltage range,
   wherein the control circuit is further configured to control the operation state of the switching element to the turn-on state or a turn-off state based on whether the measured voltage is within a preset low-voltage range, the preset low-voltage range being within the limited available voltage range and being closer to the lower limit than to the upper limit of the limited available voltage range.

2. The apparatus for supplying emergency power according to claim 1,
wherein the control circuit is further configured to release the lower limit on the available voltage range configured by the protection circuit by controlling the operation state of the switching element to electrically connect the bypass path.

3. The apparatus for supplying emergency power according to claim 1,
wherein the control circuit is further configured to control the operation state of the switching element to the turn-on state to release at least one of the lower limit and the upper limit on the available voltage range if an emergency power supply request is input.

4. The apparatus for supplying emergency power according to claim 1,
wherein the control circuit is further configured to control the operation state of the switching element to the turn-on state to release at least one of the lower limit and the upper limit on the available voltage range during a preset initial run time when the battery starts operating.

5. The apparatus for supplying emergency power according to claim 1, wherein the control circuit is further configured to:
measure a discharge time during which the battery is continuously discharged with the measured voltage within the preset low-voltage range; and
control the operation state of the switching element to the turn-on state to release the at least one of the lower limit and the upper limit on the available voltage range if at least one of the measured discharge time and the measured voltage at a charge start of the battery satisfies a predetermined condition, the charge start being when the battery starts being charged.

6. The apparatus for supplying emergency power according to claim 5,
wherein the control circuit is further configured to control the operation state of the switching element to the turn-on state to release the at least one of the lower limit and the upper limit on the available voltage range if the measured discharge time is equal to or greater than a reference time, the reference time being greater than 0.

7. The apparatus for supplying emergency power according to claim 6,
wherein after controlling the operation state of the switching element to the turn-on state, the control circuit is further configured to control the operation state of the switching element according to the measured voltage at the charge start of the battery.

8. The apparatus for supplying emergency power according to claim 7, wherein the control circuit is further configured to:
control the operation state of the switching element to a turn-off state if the measured voltage at the charge start is included in the preset low-voltage range, and
control the operation state of the switching element to the turn-on state if the measured voltage at the charge start is lower than a lower limit of the preset low-voltage range.

9. The apparatus for supplying emergency power according to claim 1,
wherein the protection circuit includes a plurality of unit protection circuits configured to limit the available voltage range of the battery by section, and
wherein the bypass circuit includes a plurality of unit bypass circuits configured to be connected in parallel to at least one of the plurality of unit protection circuits.

10. The apparatus for supplying emergency power according to claim 9,
wherein the control circuit is further configured to select a unit protection circuit whose limited voltage section is closest to a present voltage of the battery among the plurality of unit protection circuits and to control an operation state of a switching element disposed in a unit bypass unit among the plurality of unit bypass circuits corresponding to the selected unit protection circuit to a turn-on state.

11. A battery management system (BMS), comprising the apparatus for supplying emergency power according to claim 1.

12. A battery pack, comprising the apparatus for supplying emergency power according to claim 1.

13. The apparatus for supplying emergency power according to claim 1, wherein the protection circuit is not configured to control the operation state of the switching element to a turn-on state or to a turn-off state.

14. The apparatus for supplying emergency power according to claim 1, wherein:
the switching element includes a gate terminal, a source terminal, and a drain terminal, the gate terminal being configured to receive a control signal from the control circuit; and
the gate terminal of the switching element is not directly connected to the protection circuit.

15. The apparatus for supplying emergency power according to claim 1, wherein the protection circuit includes a switching circuit connected in parallel with the switching element of the bypass circuit, the switching circuit of the protection circuit being configured to limit the available voltage range of the battery.

16. The apparatus for supplying emergency power according to claim 1, wherein the preset low-voltage range is from the lower limit of the limited available voltage range to a predetermined voltage lower than the upper limit of the limited available voltage range.

* * * * *